US009070047B2

(12) United States Patent
Nowozin et al.

(10) Patent No.: US 9,070,047 B2
(45) Date of Patent: Jun. 30, 2015

(54) DECISION TREE FIELDS TO MAP DATASET CONTENT TO A SET OF PARAMETERS

(75) Inventors: Reinhard Sebastian Bernhard Nowozin, Cambridge (GB); Carsten Curt Eckard Rother, Cambridge (GB); Bangpeng Yao, Stanford, CA (US); Toby Leonard Sharp, Cambridge (GB); Pushmeet Kohli, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 196 days.

(21) Appl. No.: 13/337,309

(22) Filed: Dec. 27, 2011

(65) Prior Publication Data

US 2013/0166481 A1 Jun. 27, 2013

(51) Int. Cl.
G06K 9/62 (2006.01)
G06N 99/00 (2010.01)

(52) U.S. Cl.
CPC ............ *G06K 9/6282* (2013.01); *G06K 9/6256* (2013.01); *G06N 99/005* (2013.01); *G06K 9/6296* (2013.01)

(58) Field of Classification Search
CPC .. G06N 99/005; G06K 9/6256; G06K 9/6282
USPC ........................................................ 706/12
See application file for complete search history.

(56) References Cited

U.S. PATENT DOCUMENTS

| 6,009,199 | A | 12/1999 | Ho |
| 7,233,931 | B2 | 6/2007 | Lee et al. |
| 7,305,132 | B2 | 12/2007 | Singh et al. |
| 7,580,798 | B2 | 8/2009 | Brunner et al. |
| 7,702,596 | B2 | 4/2010 | Tu et al. |
| 7,840,059 | B2 | 11/2010 | Winn et al. |
| 2008/0075367 | A1 | 3/2008 | Winn et al. |
| 2008/0317331 | A1* | 12/2008 | Winn et al. ................... 382/154 |
| 2010/0094800 | A1 | 4/2010 | Sharp |
| 2010/0128984 | A1* | 5/2010 | Lempitsky et al. ........... 382/180 |

(Continued)

OTHER PUBLICATIONS

Payet et al., RF2—Random Forest Random Field, NIPS, 2010, pp. 1668-1675.*

(Continued)

*Primary Examiner* — Jeffrey A Gaffin
*Assistant Examiner* — Robert H Bejcek, II
(74) *Attorney, Agent, or Firm* — Sandy Swain; Judy Yee; Micky Minhas

(57) ABSTRACT

A tractable model solves certain labeling problems by providing potential functions having arbitrary dependencies upon an observed dataset (e.g., image data). The model uses decision trees corresponding to various factors to map dataset content to a set of parameters used to define the potential functions in the model. Some factors define relationships among multiple variable nodes. When making label predictions on a new dataset, the leaf nodes of the decision tree determine the effective weightings for such potential functions. In this manner, decision trees define non-parametric dependencies and can represent rich, arbitrary functional relationships if sufficient training data is available. Decision trees training is scalable, both in the training set size and by parallelization. Maximum pseudolikelihood learning can provide for joint training of aspects of the model, including feature test selection and ordering, factor weights, and the scope of the interacting variable nodes used in the graph.

20 Claims, 7 Drawing Sheets

(56) References Cited

U.S. PATENT DOCUMENTS

2010/0278384 A1 11/2010 Shotton et al.
2011/0200230 A1* 8/2011 Luke et al. .................... 382/103

OTHER PUBLICATIONS

Wang et al., Analysis and Design of a Decision Tree Based on Entropy Reduction and Its Application to Large Character Set Recognition, IEEE Transactions on Pattern Analysis and Machine Intelligence, vol. PAMI-6, No. 4, Jul. 1984, pp. 406-417.*

Nowozin et al., Decision Tree Fields, 2011 IEEE International Conference on Computer Vision, Nov. 6-13, 2011.*

Shotton et al., Semantic Texton Forests for Image Categorization and Segmentation, IEEE Conference on Computer Vision and Pattern Recognition, 2008.*

Nowozin et al., Decision Tree Fields Slides, 2011 IEEE International Conference on Computer Vision, Nov. 6-13, 2011.*

Nowozin et al., Decision Tree Fields Poster, 2011 IEEE International Conference on Computer Vision, Nov. 6-13, 2011.*

Nowozin et al., Decision Tree Fields: Supplemental Material, 2011 IEEE International Conference on Computer Vision, Nov. 6-13, 2011.*

Liao, et al., "Training Conditional Random Fields using Virtual Evidence Boosting", Retrieved at <<http://ijcai.org/Past%20Proceedings/IJCAI-2007/PDF/IJCAI07-407.pdf>>, Proceedings of the International Joint Conference on Artificial Intelligence (IJCAI), 2007, pp. 2531-2535.

Kumar, et al., "Discriminative Random Fields: A Discriminative Framework for Contextual Interaction in Classification", Retrieved at <<http://www-2.cs.cmu.edu/~skumar/application/DRF.pdf>>, IEEE International Conference on Computer Vision (ICCV), Oct. 13-16, 2003, vol. 2, pp. 1150-1157.

Boyd, Stephen, "Convex Optimization", Retrieved at <<http://homes.esat.kuleuven.be/~optec/events/STEVIN_boyd.pdf>>, Apr. 18, 2007, pp. 53.

Geman, et al., "Stochastic Relaxation, Gibbs Distributions and the Bayesian Restoration of Images", Retrieved at <<http://www.cis.jhu.edu/publications/papers_in_database/GEMAN/GemanPAMI84.pdf>>, IEEE Transactions on Pattern Analysis and Machine Intelligence, Oct. 7, 1983, No. 6, pp. 721-741.

Kirkpatrick, et al., "Optimization by Simulated Annealing", Retrieved at <<http://www.fisica.uniud.it/~ercolessi/MC/kgv1983.pdf>>, Journal: Science, vol. 220, No. 4598, May 13, 1983, pp. 671-680.

Maron, et al., "Hoeffding Races : Accelerating Model Selection Search for Classification and Function Approximation", Retrieved at <<http://citeseer.ist.psu.edu/viewdoc/download;jsessionid=B036A2745E1AEC32B5402690526C4324?doi=10.1.1.10.7504&rep=rep1&type=pdf>>, Conference: Neural Information Processing Systems—NIPS, 1994, pp. 59-66.

Mason, et al., "Boosting Algorithms as Gradient Descent", Retrieved at <<http://www.cs.cmu.edu/Groups/NIPS/NIPS99/99papers-pub-on-web/Named-gz/MasonBaxterBartlettFrean.ps.gz>>, pp. 7.

Dietterich, et al., "Training Conditional Random Fields via Gradient Tree Boosting", Retrieved at <<http://citeseer.ist.psu.edu/viewdoc/download;jsessionid=F75466AB212213536B42858BDOA0F605?doi=10.1.1.58.6703&rep=rep1&type=pdf>>, Proceedings of the twenty-first international conference on Machine learning (ICML), 2004, pp. 217-224.

Alahari, et al., "Efficient Piecewise Learning for Conditional Random Fields", Retrieved at <<http://www.di.ens.fr/~alahari/papers/alahari10a.pdf>>, IEEE Conference on Computer Vision and Pattern Recognition (CVPR), Jun. 13-18, 2010, pp. 895-901.

Dobra, Alin, "Classification and Regression Tree Construction", Retrieved at <<http://citeseerx.ist.psu.edu/viewdoc/download?doi=10.1.1.84.843&rep=rep1&type=pdf>>, Nov. 25, 2002, pp. 1-18.

Wainwright, et al., "Graphical Models, Exponential Families, and Variational Inference", Retrieved at <<http://www.eecs.berkeley.edu/~wainwrig/Papers/WaiJor08_FTML.pdf>>, Foundations and Trends in Machine Learning, vol. 1, No. 1-2, 2008, pp. 1-305.

Bertsekas, Dimitri P., "Nonlinear Programming", Retrieved at <<http://lawww.epfl.ch/webdav/site/la/shared/import/migration/IC_32/ic-32_lectures-1-8.pdf>>, Athena Scientific, Danskin's theorem, Sep. 1999, pp. 1-60.

Birgin, et al., "Nonmonotone Spectral Projected Gradient Methods on Convex Sets", Retrieved at <<http://citeseerx.ist.psu.edu/viewdoc/download?doi=10.1.1.67.1456&rep=rep1&type=pdf>>, SIAM Journal on Optimization, vol. 10, No. 4, Jun. 7, 1999, pp. 1-20.

Schmidt, et al., "Optimizing Costly Functions with Simple Constraints: A Limited-memory Projected Quasi-newton Algorithm", Retrieved at <<http://jmlr.csail.mit.edu/proceedings/papers/v5/schmidt09a/schmidt09a.pdf>>, Proceedings of the 12th International Conference on Artificial Intelligence and Statistics (AISTATS), 2009, pp. 456-463.

Wallach, Hanna M., "Conditional Random Fields: An Introduction", Retrieved at <<http://www.inference.phy.cam.ac.uk/hmw26/papers/crf_intro.pdf>>, University of Pennsylvania, CIS Technical Report, Report No. MS-CIS-04-21, Feb. 24, 2004, pp. 1-9.

* cited by examiner

US 9,070,047 B2

DECISION TREE FIELDS TO MAP DATASET CONTENT TO A SET OF PARAMETERS

CROSS-REFERENCE TO RELATED APPLICATIONS

The present application is related to U.S. patent application Ser. No. 13/337,324, entitled "Discriminative Regression Tree Fields" and filed concurrently herewith, specifically incorporated by reference herein for all that it discloses and teaches.

BACKGROUND

The task of labeling or classifying unknown data to a set of known data arises in many fields, including computer vision, bioinformatics, computational linguistics, and speech recognition. For example, given an image comprising individual pixels, each pixel may be labeled as either foreground or background. Alternatively, each pixel may be labeled as being a member of the set of pixels belonging to one object or another object in the image. Other labeling applications are contemplated.

Conditional Random Fields (CRFs) represent a powerful class of models for labeling problems. In one view, CRFs provide a probabilistic framework for labeling and segmenting sequential data based on a model that defines a conditional probability p(y|x) over labels y given a particular observation x. For example, such conditional models may be used to label an unknown pixel x by selecting the label y that maximizes the conditional probability p(y|x). However, existing models for implementing accurate CRFs have generally proven intractable

SUMMARY

Implementations described and claimed herein address the foregoing problems by providing a new tractable model for solving labeling problems, which provides potential functions having arbitrary dependencies upon an observed dataset (e.g., image data). The new model uses decision trees corresponding to various factors to map dataset content (e.g., image content) to a set of parameters used to define the potential functions in the model. Some factors define relationships among multiple variable nodes. When making label predictions on a new dataset (e.g., an unlabeled image), the leaf nodes of the decision tree determine the effective weightings for such potential functions. In this manner, the decision trees define non-parametric dependencies and can represent rich, arbitrary functional relationships if sufficient training data is available. Further, the training of decision trees is scalable, both in the training set size and in the fact that the training can be parallelized. In one implementation, maximum pseudolikelihood learning provides for joint training of various aspects of the model, including feature test selection and ordering (i.e., the structure of the decision trees), weights of each factor in the graph, and the scope of the interacting variable nodes used in the graph.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

There are three challenges relating to the use of probabilistic graphical models to solve computer vision (and other) tasks: parameterization, learning, and inference. Parameterization represents the specification of a model structure and its related parameters. Learning represents the estimation of model parameters from training data. Inference represents the test-time task of reasoning about the state of the variables of interest, given an unlabeled dataset (e.g., labels on individual pixels in an unlabeled image). In a computer vision example, various labeling scenarios may involve labeling individual pixels with specific properties, such as either foreground or background, as belonging to one object or another, and/or as being part of one body part or another. Each label can identify a property associated with the pixel.

Figure 1:
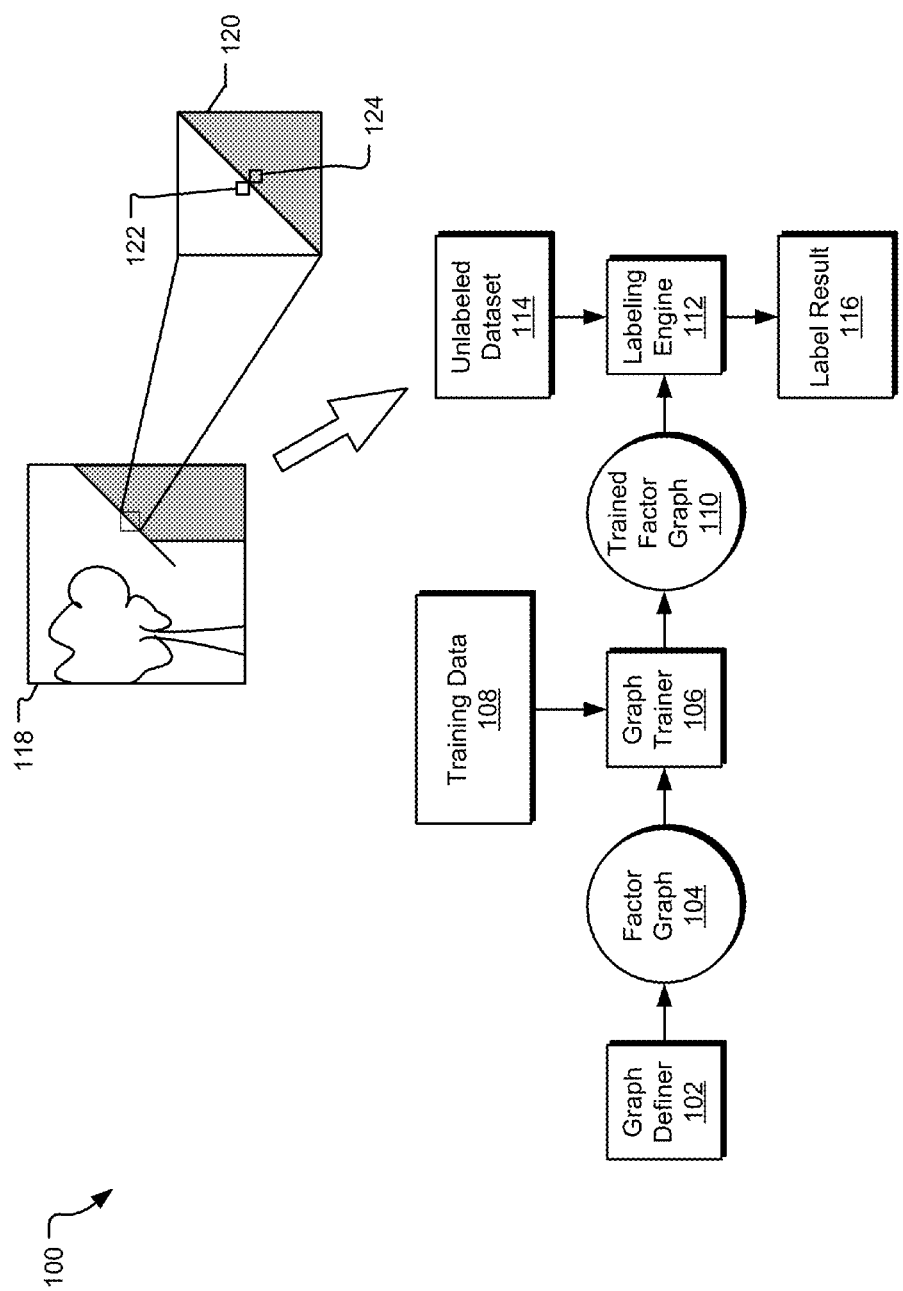
FIG. 1 illustrates an example labeling system for labeling observations using discriminative decision tree fields.

FIG. 1 illustrates an example labeling system 100 for labeling observations using discriminative decision tree fields. A graph definer 102 creates a factor graph 104 from a set of replicate factor graph models, wherein each factor is defined as a decision tree. The graph definer 102 replicates the factor graph model corresponding to each node of the factor graph 104. Each node of the factor graph 104 corresponds to an element (e.g., a pixel) of a dataset x (e.g., an image), where x represents a dataset with the set of all possible datasets (x∈X) (e.g., an image in the set of all possible images). As discussed below, the factor graph 104 includes at least one multi-dimensional factor, such as a pairwise factor defining a relationship between two neighboring pixels in an image or a higher order actor defining relationships among more than two neighboring pixels in an image. It should be understood that neighboring pixels may be sparsely distributed and need not be adjacent to one another. The factor graph 104 may also include unary factors (i.e., a factor dependent on only one node). Each factor informs the labeling of properties for one or more variable nodes in the factor graph 104.

A graph trainer 106 receives training data 108, such a set of known (e.g., previously labeled) images. For example, if the labeling system 100 is used to segment different objects within an image, the training data 108 may include a number of images in which various objects have already been labeled. As such, the training data 108 includes training datasets and the associated labeling information. The graph trainer 106 uses the training data 108 to convert the untrained factor graph 104 into a trained factor graph 110 in which the structure of the decision trees, the parameterization for each factor, and the structure of the factor graph model replicated for each factor has been determined. The factors contribute to a potential function (e.g., an energy function) for each variable node and therefore to the labeling of the dataset element associated with that variable node.

A labeling engine 112 receives the trained factor graph 110 and an unknown dataset 114 (such as an unlabeled image 118). The labeling engine 112 applies the trained factor graph 110 to the dataset 114 to generate a labeled result 116. In the example of the unlabeled image 118, the labeling engine 112 attempts to accurately label pixels (such as pixels 122 and 124) according to an object or region within the image 118. For example, as shown in a magnified view 120, the pixel 124 could properly be labeled as a pixel within the building structure and the pixel 122 could properly be labeled as a pixel within the background.

The described technology may be applied to other types of labeling within different types of datasets, including without limitation body part identification within a depth map, character recognition, voice recognition, biological sample identification, etc.

In yet another implementation, the described technology can be applied to de-noising (e.g., inpainting pixels within text characters, such Chinese language characters). In such an implementation, a one-dimensional continuous problems is encoded as $\{[1,0],[0,1]\}$. As the number of possible labels increases, such as a de-noising problem having $256^3$ possible labels, the weighting matrices may be replaced with a linear combination of basis functions, such that:

$$w_u = \sum_{b=1}^{B} w'_{ub} w_{ub}, \quad w_{ph} = \sum_{b=1}^{B} w'_{phb} w_{phb}, \text{ and } w_{pv} = \sum_{b=1}^{B} w'_{pvb} w_{pvb}$$

where B is the number of basis functions and the matrices $\underline{w}$ are fixed so that each summation includes B scalars, such as $w'_{u1}, \ldots, w'_{uB}$.

Figure 2:
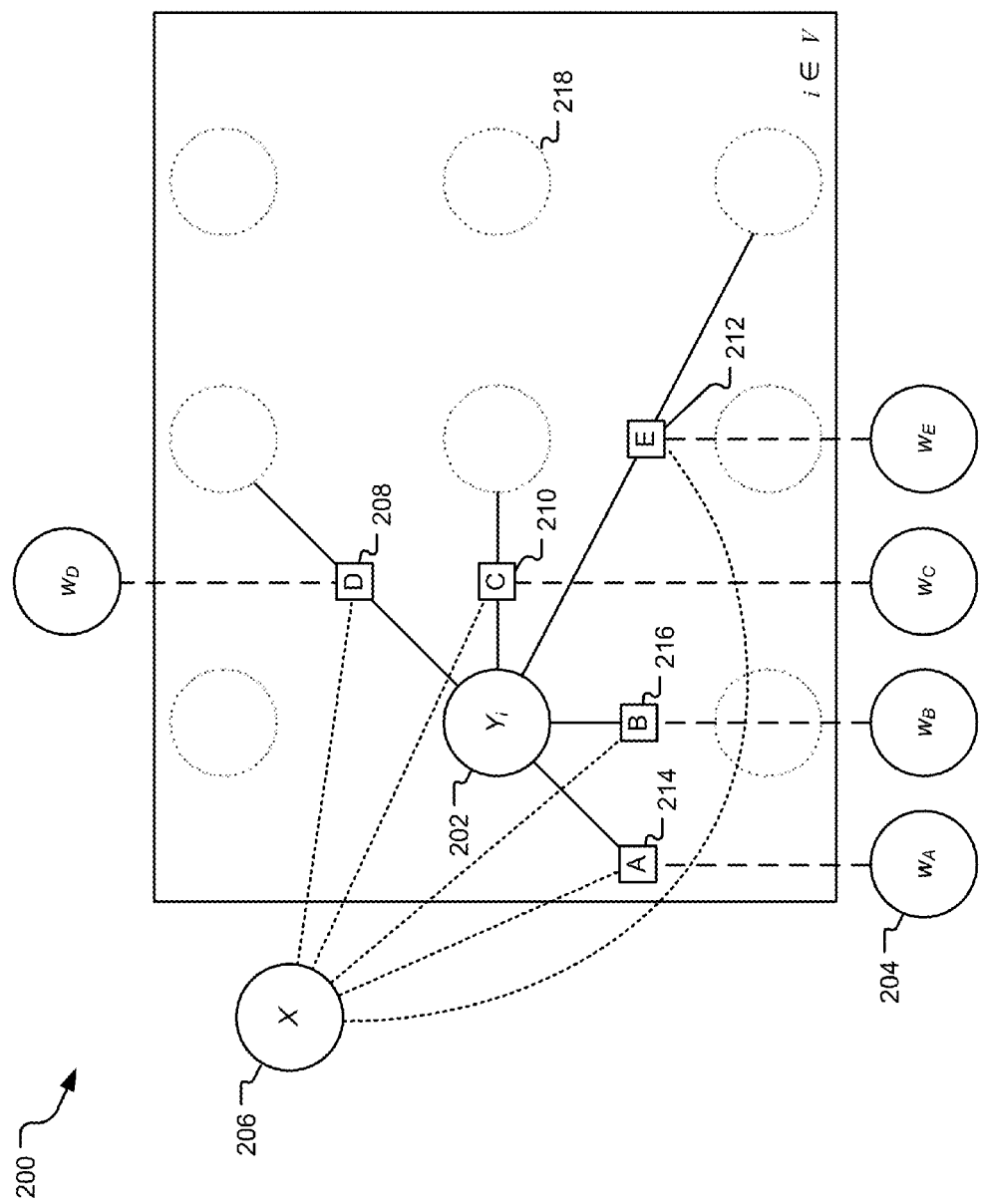
FIG. 2 illustrates an example factor graph model for labeling observations using discriminative decision tree fields.

FIG. 2 illustrates an example factor graph model 200 for labeling observations using discriminative decision tree fields. The factor graph model 200 is replicated for each variable node within the factor graph corresponding to a given unlabeled variable node (e.g., an unlabeled pixel). The notation employed in the factor graph model 200 can be used to define an energy function for labeling observations. The factor graph model 200 represents a tuple (V, F, E), where V represents the set of all unobserved variable nodes (such as unobserved variable node 202), F represents the set of all factor nodes (such as factor nodes 208, 210, 212, 214, and 216), and E represents the set of all edges, such that $E \subseteq V \times F$. In addition, the factor graph model 200 is informed by observed weight vector nodes, such as weight vector node 204, and an observed data node 206. In an image processing implementation, for example, each variable node corresponds to a label $y_i$ for an individual pixel $x_i$ in a pixel grid x (e.g., an image).

In one implementation, individual factors are repeated for a given dataset, such as an image. For example, the factors and the associated weight vectors are replicated for multiple pixels in a pixel grid. However, the evaluation of the individual decision tree for each factor is based on each pixel of interest, thereby resulting on an energy value for each variable node that specifically characterizes the variable node.

A factor type compactly describes the set of repeated factors as a tuple, wherein the three elements of the factor type, in one implementation, are:

A set of offsets—These offsets define how to reach the different parameter sets present in a factor. For example, a unary factor has the offset (0.0) and a horizontal pair-wise factor has the offsets $\{(0,0), (1,0)\}$.

A decision tree—A decision tree is defined by a set of feature tests and the tree-order of these tests. For example, one feature test within a decision tree may compare the brightness of a pixel against a threshold, and another may compare the color of the pixel against a predefined color standard.

A weight vector

A given pixel grid and a given factor type uniquely define how many factors of the factor type will be instantiated to create to factor graph. Each factor type has a weight vector, shared by all factors of that type. For example, in FIG. 2, all of the factors that are of the unary factor type A are connected to the weight vector $w_A$. In addition, each factor type has a decision tree attached to it, such that each factor type may be referred to as the "factor of a tree."

In addition to the notation described above, other notation warrants introduction:

N represents the set of variable nodes that are neighbors of a factor F and is termed the "scope" of the factor, such that $N(F)=\{i \in V: (i,F) \in E\}$.

Y represents the set of all properties (e.g., labels) of the variable nodes V, and $y \in Y$ For a factor F, a property (e.g., a label) of the variables associated with the factor is $y_{N(F)} \in Y_F$ and shorthand for $y_{N(F)}$ is $y_F$, denoting the collection $(y_i)_{i \in F}$. In addition, $Y_F$ represent the product domain of all properties (e.g., labels) of the involved variable nodes, i.e., $Y_F = \times_{i \in N(F)} Y_i$.

Neighboring factors $M(i) \subseteq F$ of variable i.

Neighboring factors $M_t(i) \subseteq F$ of variable i that are of type/tree t.

A tree $t_F$ is a factor type associated with the factor F.

$w_t(r, y_F) \in \mathfrak{R}$ represents real parameters related to a single tree node r of tree t and a single configuration of $y_F$.

$w_t(y_F) \in \mathfrak{R}^n$ represents real parameters related to a single tree t and a single configuration of $y_F$, where n is the number of nodes in the tree.

$w_t \in \mathfrak{R}^{n|Y_F|}$ represents real parameters related to a single tree, where $|Y_F|$ is the cardinality of the set. Accordingly, $W_{t_F}$ represents the parameters related to the tree $t_F$ of factor F.

w represents the stacked parameters of all trees.

$x_F$ represents the dataset x contained in a factor F. Formally, $x_F$ represents a tuple (x, position of F in the dataset) and the dataset x may be an image or some other dataset.

Turning back to FIG. 2, the factor graph model 200 includes three pairwise factor types (of factor nodes 208, 210, and 212) and two unary factor types (of factor nodes 214 and 216). All factors depend on the data of the dataset x (e.g. an image). The basic factor graph model 200 is replicated for each additional variable node (e.g., see variable node 218), where $i \in V$, although such replications are not shown in FIG. 2.

Building on the notation described above and using an image processing context, $x \in X$ defines a given observed image x of a set of all possible images X. Accordingly, an implementation of a labeling process infers a discrete label for property y of a set of all properties Y (i.e., $y \in Y$), where the labeling is on a per-pixel basis and $y=(y_i)_{i \in V}$, and $y_i \in L$ (all variables have the same label set L). An energy function E defines the relationship between x and y. In one implementation, an energy function decomposes into a sum of energy functions $E_{t_F}$ over factor F, where F defines a subset of properties $y_i$, such as the energy function given in Equation (1):

$$E(y, x, w) = \sum_{F \in F} E_{t_F}(y_F, x_F, w_{t_F}). \quad (1)$$

In one implementation using Equation (1), a discrete labeling that minimizes the energy function E(y,x,w) is assigned to each pixel. In this manner, individual factors inform the labeling assigned to each pixel by the way each factor influences the energy functions $E_{t_F}$.

In one implementation, the energy function $E_{t_F}$ is the same for all factors of the same factor type, but the properties and data content each energy function $E_{t_F}$ acts upon differs. Furthermore, each energy function $E_{t_F}$ is parameterized by means of a weight vector $w_{t_F}$ as discussed below.

The energy function of Equation (1) defines a conditional probability distribution $$p(y|x, w) = \frac{1}{Z(x, w)} \exp(-E(y, x, w)) \quad (2)$$

where $Z(x,w) = \Sigma_{y \in Y} \exp(-E(y,x,w))$ is the normalizing constant. Each energy function $E_t$ is associated with a decision tree. The energy function $E_{t_F}(y_F, x_F, w_{t_F})$ is evaluated by performing a sequence of feature tests s on the dataset $x_F$ (e.g., the image) starting at the root of the decision tree associated with the factor F and traversing the decision tree from left or right. Feature tests represent tests applied to the dataset element of interest (and potentially one or more of its neighbors). Example feature tests in an image processing context may include without limitation brightness tests, color tests, comparisons between characteristics of different pixels, saturation tests, etc.

When a leaf node has been reached, the traversal path through the nodes of the decision tree is recorded. Each node q of the decision tree is associated with a table of parameters (e.g., energy values) $w_{t_F}(q, y_F)$. Depending on the number of properties $y_F$ that the energy function of the factor acts on the table can be a vector (unary), a matrix (pairwise), or a general k-dimensional array (higher order). The tables along the traversal path are summed, computing the energy as $$E_{t_F}(y_F, x_F, w_{t_F}) = \sum_{q \in Path(x_F)} w_{t_F}(q, y_F)$$

where $Path(x_F)$ denotes the set of nodes visited in the traversal of the decision tree of factor F. In one implementation, the summation along each root-to-leaf node path can be pre-computed so that the summation result can be stored at each leaf node. To compute the overall energy, based on Equation (1), for example, $E_{t_F}$ is evaluated for all factors F∈F.

Figure 3:
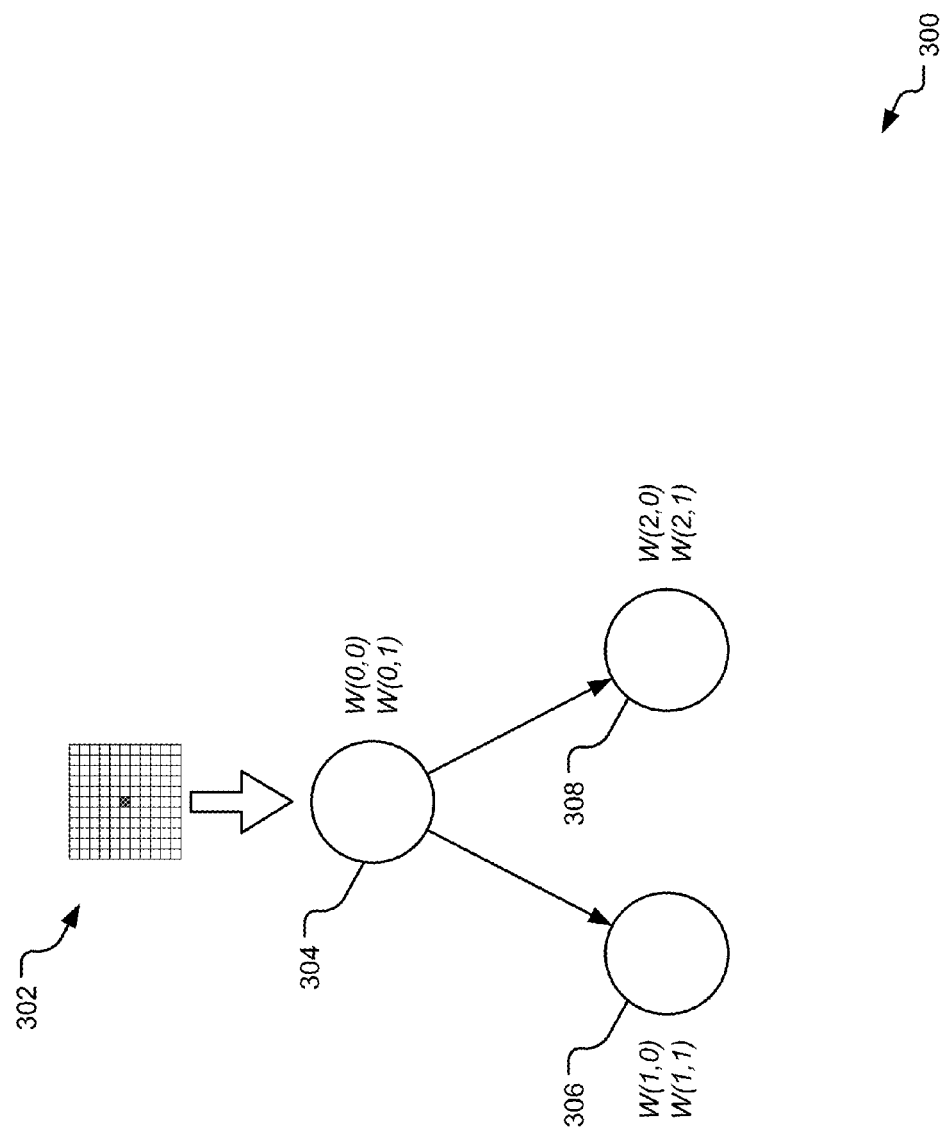
FIG. 3 illustrates an example decision tree for a unary factor type with binary labels.

FIG. 3 illustrates an example decision tree 300 for a unary factor type with binary labels. The decision tree 300 has two labels ($|y_F|=2$) and three nodes, resulting in a total of six parameters. The parameters at the root node (e.g., w(0,0)) are not conditioned on content of the dataset, while the non-root nodes depend on the content of the dataset 302, which is represented in FIG. 3 as an 11×11 patch of an image centered on a pixel i of interest. The decision tree 300 includes binary labels, although a higher number of labels may be provided by a tree of greater depth.

Figure 4:
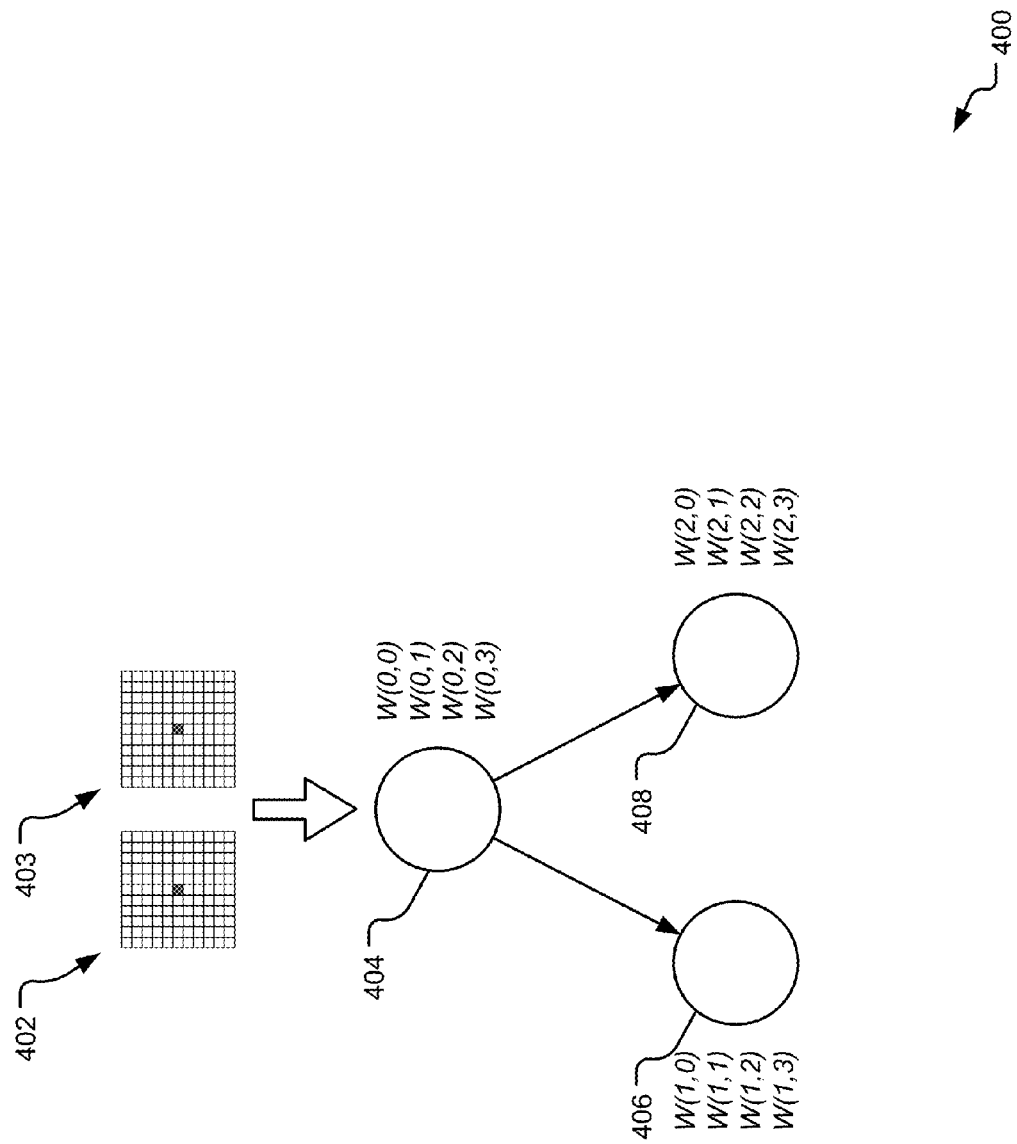
FIG. 4 illustrates an example decision tree for a pairwise factor type with binary labels.

FIG. 4 illustrates an example decision tree 400 for a pairwise factor type with binary labels. The decision tree 400 has four labels ($|y_F|=4$) and three nodes, resulting in a total of 12 parameters. The parameters at the root node (e.g., w(0,0)) are not conditioned on content of the dataset, while the non-root nodes depend on the content of a dataset 402, which is represented in FIG. 4 as a 11×11 patch of an image centered on a pixel i of interest, and a dataset 403, which is represented in FIG. 4 as a 11×11 patch of an image centered on a pixel j of interest. Accordingly, the decision tree 400 corresponds to a pairwise factor type associated with the relationship between pixels i and j. The decision tree 400 includes binary labels, although a higher number of labels may be provided by a tree of greater depth.

Figure 5:
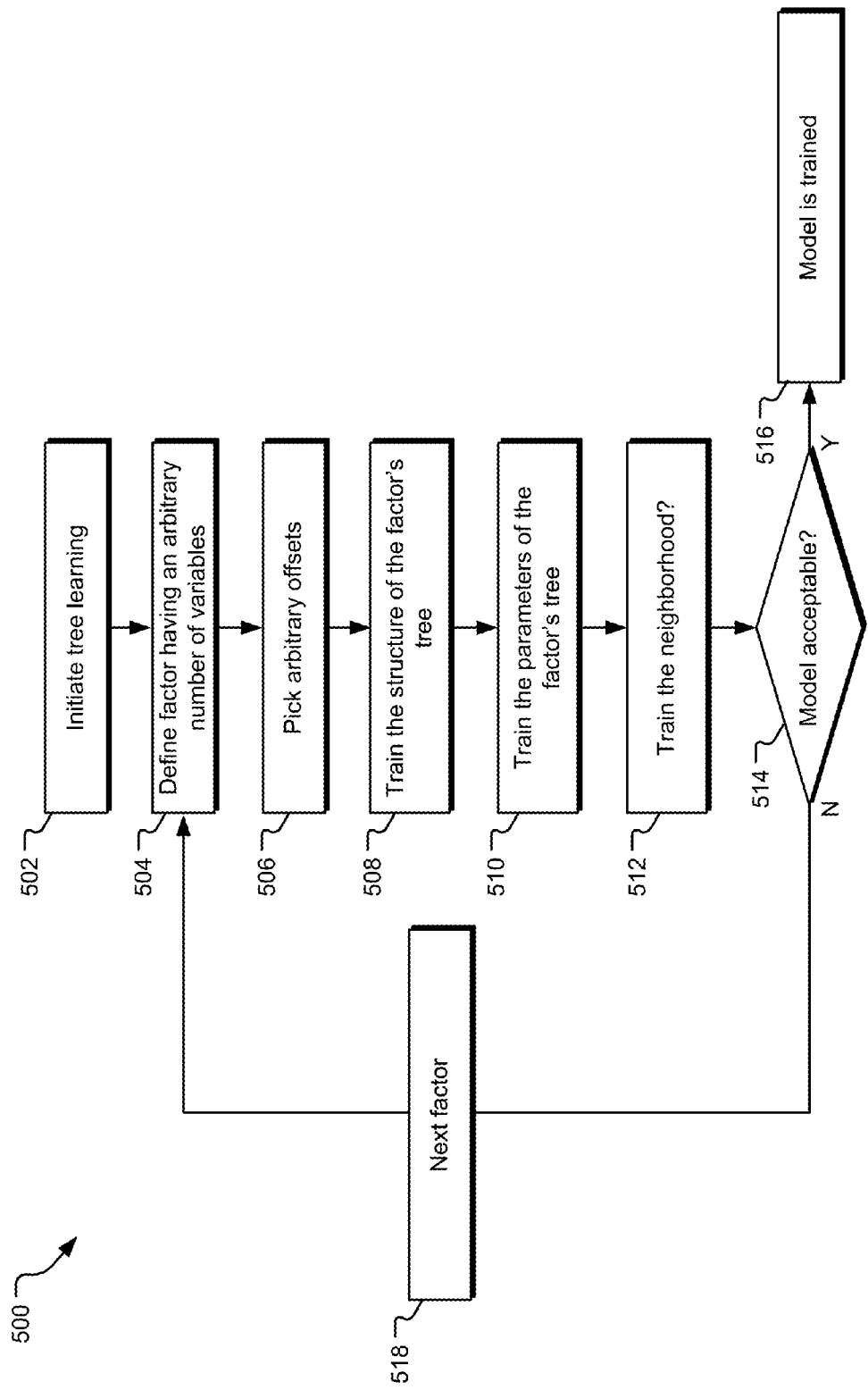
FIG. 5 illustrates example operations for training discriminative decision trees.

FIG. 5 illustrates example operations 500 for training discriminative decision trees. The operations 500 are described with regard to training an image labeling system, but other applications, systems, and datasets are also contemplated. Given an arbitrary factor graph model, such as the example described with regard to FIG. 2 or some variation thereof, each factor includes a decision tree. The operations 500 may be applied to iteratively train each decision tree, including its structure and the parameters. Moreover, the factor graph model itself may be refined to define an effective scope of the neighbors included in the factor graph model.

An initial operation 502 starts the tree learning process, starting with an initial factor and its corresponding decision tree (e.g., TreeNumber=1). A defining operation 504 defines the factor to include an arbitrary number of variables. An offset operation 506 assigns arbitrary offsets to each variable (typically, the first variable in the tree is assigned the offset (0,0)).

The offset operation 506 is followed by a sequence of training operations 508, 510, and 512, which use an independent and identically distributed (iid) random variable set $\{(x_m, y^*_m)\}_{m=1, \ldots, M}$ of images $x_m$ and known labelings $y^*_m$. The training operation 508 trains the decision tree for the current factor to determine the structure of the decision tree, which may be characterized by the selection and ordering of the feature tests within the decision tree and depth of the decision tree. In one implementation, the training operation 508 selects the feature tests for each node in the decision tree to minimize entropy of the tests at each node of the decision tree. In one implementation, for each node, the feature test that minimizes entropy is selected and fixed in a greedy tree construction scheme. Then a next node in the decision tree is selected recursively until the feature test at each node in the decision tree is fixed. The recursion continues until the unused training samples are exhausted, the number of used training samples increases above a predefined recursion threshold, or the number of unused training samples falls beneath a predefined recursion threshold. The resulting decision tree, as characterized by its depth, its feature tests, and the order thereof.

Having determined the structure of the decision tree at the current factor, the training operation 510 initializes the parameters of the decision trees (e.g., sets them to zero) and trains the parameterization of the decision tree for the current factor using an objective function, such as by optimizing a pseudolikelihood. Training each factor's decision tree can involve selecting the neighborhood structure applied to the decision tree, the structure of the decision tree, and the parameters (e.g., weights) stored in the decision tree nodes. The training operation 510 estimates the parameters w of the decision tree for the current factor, such as to predict $y^*_m$ for a given $x_m$. In this description, the set of images x are treated as one large collection of pixels, although other contexts may be employed.

The training operation 510 uses an objective function to determine the parameters of the decision tree. In one implementation, the objective function is in the form of a log-likelihood. In another implementation, the objective function is in the form of a tractable pseudolikelihood that defines a surrogate likelihood that is maximized or an approximate maximum likelihood. The pseudolikelihood is derived from the per-variable conditional distributions $p(y_i|y^*_{V\{i\}}, x, w)$. By defining $l_i(w) = -\log p(y_i|y_{V\{i\}}, x, w)$, the regularized negative log-pseudolikelihood $l_{npl}(w)$ as the average $l_i$ over all pixels can be written as:

$$\ell_{npl}(w) = \frac{1}{|V|} \sum_{i \in V} \ell_i(w) - \frac{1}{|V|} \sum_{t} \log p_t(w_t) \quad (3)$$

where $p_t(w_t)$ is a prior distribution over $w_t$ used to regularize the weights. Using multivariate Normal distributions $N(0, \sigma_t I)$, the $-\log p_t(w_t)$ term is of the form $$\frac{1}{2\sigma_t^2} \|w_t\|^2 + C_t(\sigma^2),$$

and the constant $C_t(\sigma^2)$ can be omitted during optimization because it does not depend on w. For each factor type t, the prior hyperparameter $\sigma_t 0$ controls the overall influence of the factor. As such, a suitable value of $\sigma_t$ is chosen by a model selection procedure, such as a cross validation.

Equation (3) is convex, differentiable, and tractably computable. For optimization, a Limited-memory Broyden-Fletcher-Goldfarb-Shanno (L-BFGS) numerical optimization method is used in one implementation, although other methods may be employed. In this example L-BFGS implementation, $l_i(w)$ and a gradient $\nabla_{w_t} l_i(w)$ are iteratively computed to yield $$\ell_i(w) = \quad (4)$$
$$\sum_{F \in M(i)} E_F(y^*_F, w_{t_F}) + \log \sum_{y_i \in Y_i} \exp\left(-\sum_{F \in M(i)} E_F(y_i, y^*_{V\{i\}}, x, w_{t_F})\right)$$

and $$\nabla_{w_t} \ell_i(w) = \sum_{F \in M_t(i)} \nabla_{w_t} E_F(y^*, x, w_t) - \quad (5)$$
$$E_{y_i \sim p(y_i|y^*_{V\{i\}}, x, w)}\left[\sum_{F \in M_t(i)} \nabla_{w_t} E_F(y_i, y^*_{V\{i\}}, x, w)\right]$$

where M(i) denotes the subset of F that involves $y_i$, and $M_t(i)$ also denotes the subset of F that involves $y_i$ but is further restricted to factors of matching type, i.e., $M_t(i) = \{F \in M(i): t_F = t\}$. By summing Equations (4) and (5) over all pixels in all images, the objective $l_i(w)$ and its gradient $\nabla_{w_t} l_i(w)$ are obtained, respectively.

Yet another training operation 512 determines the scope of the neighborhood around any pixel of interest that is to be included in the factor graph model. In one implementation, a set of candidate interactions is proposed at random, and their weights are initialized to zero. For each candidate interaction, the potential decrease in the learning objective is assessed by measuring the norm of the gradient of the respective weights of this interaction. The larger this norm, the more likely the interaction is going to help in reducing the learning objective function. Accordingly, candidate interactions having gradient norms satisfying an interaction condition (e.g., exceeding a predefined threshold) are retained, while those having gradient norms that do not satisfy the interaction condition are not retained.

A decision operation 514 manages the iterations within the learning processes. In one implementation, the decision operation 514 determines how much the objective function has decreased with regard to the previous iteration. If the decrease does not satisfy an acceptance condition (e.g., is not below an acceptance threshold), then an iteration operation 518 moves to a new factor and continues processing at the defining operation 504. Otherwise, the model is deemed trained at operation 516.

In one implementation, the learning process iterates through all trees in the factor graph model until each factor's decision tree is optimized (after which the learning process terminates at operation 516.

Figure 6:
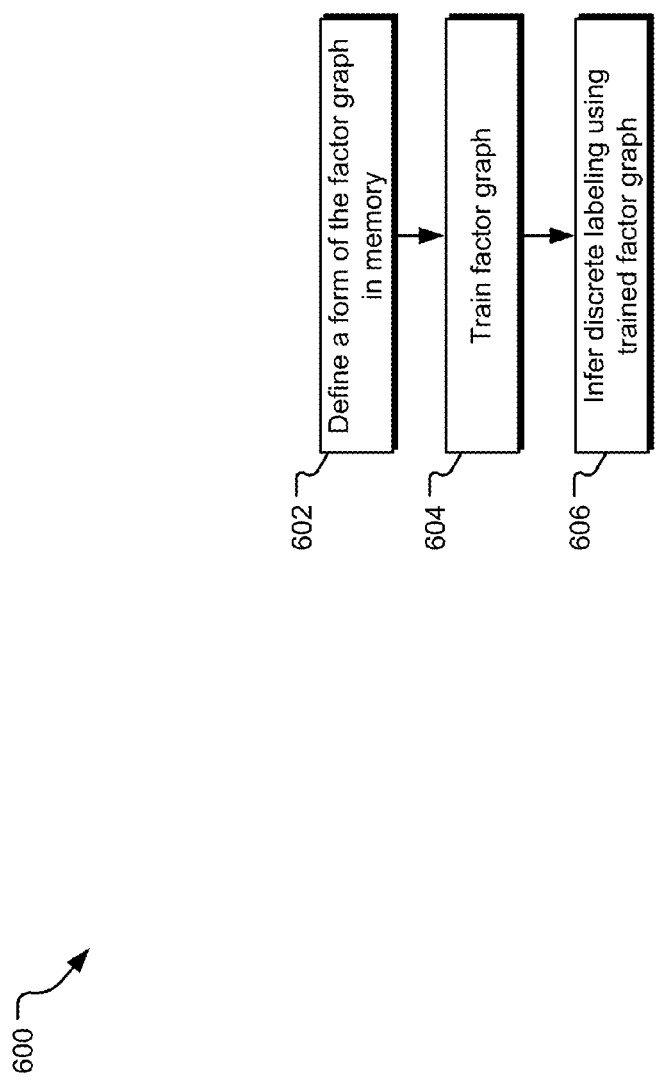
FIG. 6 illustrates example operations for labeling observations using discriminative decision trees.

FIG. 6 illustrates example operations 600 for labeling observations using discriminative decision trees to infer labeling. A defining operation 602 defines in storage (such as computer memory) the form of the factor graph model for each variable node (e.g., corresponding each pixel in an image). A training operation 604 trains the factor graph, such as using the training processed described with regard to FIG. 5.

An inference operation 606 receives an unlabeled dataset (such as an unobserved image) and applies the factor graph to each element (e.g., pixel) in the dataset. During the inference operation 606, each dataset element is associated with a variable node of a replicated factor graph model in the factor graph. The inference operation 606 executes the factor graph model on each dataset element (e.g., pixel), determining and summing $E_{t_F}$ for each dataset element to determine the labeling that minimizes E(y,x,w). That labeling is assigned to the data elements of the dataset. For making maximum posterior marginal predictions (MPM predictions), one implementation uses an efficient Gibbs sampler. For obtaining approximate maximum a posteriori probability (MAP) predictions, the Gibbs sampler with simulated annealing may be employed.

Figure 7:
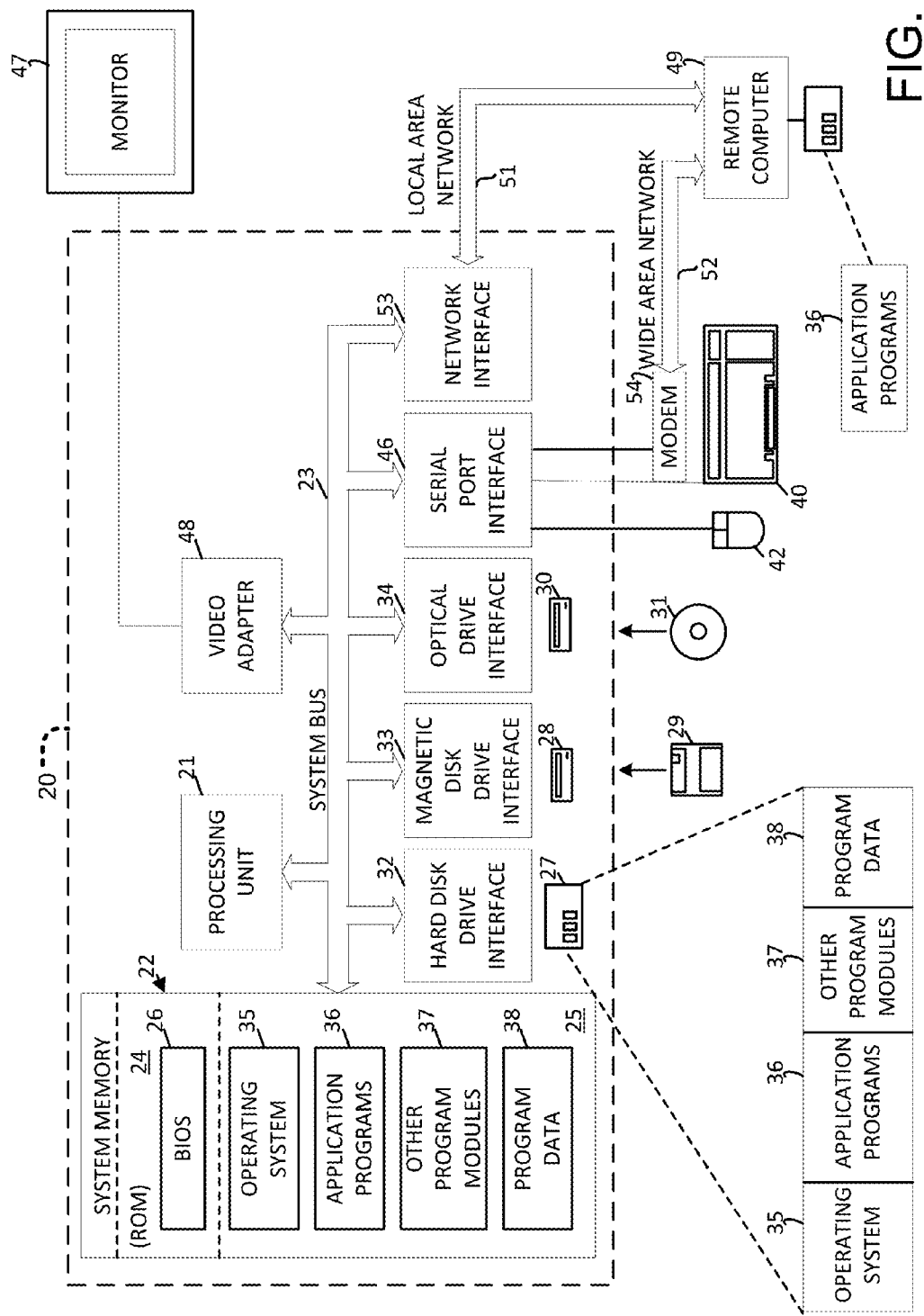
FIG. 7 illustrates an example system that may be useful in implementing the technology described herein.

FIG. 7 illustrates an example system that may be useful in implementing the technology described herein. The example hardware and operating environment of FIG. 7 for implementing the described technology includes a computing device, such as general purpose computing device in the form of a gaming console or computer 20, a mobile telephone, a personal data assistant (PDA), a set top box, or other type of computing device. In the implementation of FIG. 7, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during startup, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated storage media provide nonvolatile storage of computer-readable instructions, data structures, program engines, and other data for the computer 20. It should be appreciated by those skilled in the art that any type of computer-readable storage media which can store data that is accessible by a computer, such as magnetic cassettes, flash memory cards, digital video disks, random access memories (RAMs), read only memories (ROMs), and the like, may be used in the example operating environment. The computer-readable storage media used is not a carrier wave.

A number of program engines may be stored on the hard disk, magnetic disk 29, optical disk 31, ROM 24, or RAM 25, including an operating system 35, one or more application programs 36, other program engines 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 7. The logical connections depicted in FIG. 7 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of and communications devices for establishing a communications link between the computers may be used.

In an example implementation, a graph definer, a graph trainer, a labeling engine, and other operators and services may be embodied by instructions stored in memory 22 and/or storage devices 29 or 31 and processed by the processing unit 21. Training data, parameter tables, unlabeled datasets, label results, and other data may be stored in memory 22 and/or storage devices 29 or 31 as persistent datastores. Operators and services may be implemented using a general-purpose computer and specialized software (such as a server executing service software), a special purpose computing system and specialized software (such as a mobile device or network appliance executing service software), or other computing configurations.

The embodiments of the invention described herein are implemented as logical steps in one or more computer systems. The logical operations of the present invention are implemented (1) as a sequence of processor-implemented steps executing in one or more computer systems and (2) as interconnected machine or circuit engines within one or more computer systems. The implementation is a matter of choice, dependent on the performance requirements of the computer system implementing the invention. Accordingly, the logical operations making up the embodiments of the invention described herein are referred to variously as operations, steps, objects, or engines. Furthermore, it should be understood that logical operations may be performed in any order, unless explicitly claimed otherwise or a specific order is inherently necessitated by the claim language.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    defining in processor-readable memory a factor graph including a factor graph model replicated for each variable node of a set of variable nodes, each variable node being informed by one or more factor types in the factor graph model, each factor type being implemented as a single decision tree;
    training structure and parameterization of each decision tree using training data having a plurality of datasets, each dataset having elements of at least one labeled property, the training executing an objective function that determines the parameters of each decision tree; and
    storing a trained factor graph.

2. The method of claim 1 further comprising:
    executing the factor graph on an dataset having elements of at least one unlabeled properties to determine a label for the at least one unlabeled property for each element.

3. The method of claim 2 wherein the executing operation comprises:
    minimizing an energy function to determine the label for the at least one unlabeled property for each element.

4. The method of claim 1 wherein at least one factor type defines the relationship between at least two variable nodes.

5. The method of claim 1 wherein the training operation comprises:
   determining one or more parameters for each factor type in the factor graph model using a pseudolikelihood computation.

6. The method of claim 1 wherein the training operation comprises:
   determining the structure of each decision tree by iteratively minimizing entropy for each feature test in the decision tree.

7. The method of claim 1 further comprising:
   determining the scope of each replicated factor graph model in the factor graph by selecting factor types that minimize a pseudolikelihood computation for each factor type.

8. The method of claim 1 wherein at least one dataset includes an image and the element of the dataset is a pixel in the image.

9. A labeling system comprising:
   one or more processors;
   a graph definer executed by the one or more processors and configured to define a factor graph in processor-readable memory, the factor graph including a factor graph model replicated for each variable node of a set of variable nodes, each variable node being informed by one or more factor types in the factor graph model, each factor type being implemented as a single decision tree, at least one factor type defining the relationship among more than two variable nodes; and
   a graph trainer executed by the one or more processors and configured to train structure and parameterization of each decision tree using training data having a plurality of datasets, each dataset having elements of at least one labeled property, the training executing an objective function that determines the parameters of each decision tree.

10. The labeling system of claim 9 further comprising:
    a labeling engine configured to execute the factor graph on an dataset having elements of at least one unlabeled properties to determine a label for the at least one unlabeled property for each element.

11. The labeling system of claim 10 wherein the labeling engine is further configured to minimize an energy function to determine the label for the at least one unlabeled property for each element.

12. A labeling system for generating a trained factor graph, the labeling system comprising:
    processor-readable memory;
    a graph definer configured to define in the processor-readable memory a factor graph including a factor graph model replicated for each variable node of a set of variable nodes, each variable node being informed by one or more factor types in the factor graph model, each factor type being implemented as a single decision tree; and
    a graph trainer configured to train structure and parameterization of each decision tree using training data having a plurality of datasets, each dataset having elements of at least one labeled property, the training executing an objective function that determines the parameters of each decision tree, the trained factor graph being stored in the processor-readable memory.

13. The labeling system of claim 12 wherein at least one factor type defines the relationship between at least two variable nodes.

14. The labeling system of claim 12 further comprising:
    a labeling engine configured to execute the factor graph on a dataset having elements of at least one unlabeled properties to determine a label for the at least one unlabeled property for each element.

15. The labeling system of claim 14 wherein the labeling engine is further configured to minimize an energy function to determine the label for the at least one unlabeled property for each element.

16. The labeling system of claim 12 wherein the graph trainer is further configured to determine one or more parameters for each factor type in the factor graph using a pseudolikelihood computation.

17. The labeling system of claim 12 wherein the graph trainer is further configured to determine the structure of each decision tree by iteratively minimizing entropy for each feature test in the decision tree.

18. The labeling system of claim 12, wherein the graph trainer is further configured to determine the scope of each replicated factor graph model in the factor graph by selecting factor types that minimize a pseudolikelihood computation for each factor type.

19. The labeling system of claim 14 wherein the dataset includes an image and the element of the dataset is a pixel in the image.

20. The labeling system of claim 12 further comprising:
    one or more processors configured to execute the graph definer and the graph trainer.

* * * * *